(12) United States Patent
Leone et al.

(10) Patent No.: US 12,428,512 B2
(45) Date of Patent: Sep. 30, 2025

(54) DEGRADABLE CROSSLINKERS FOR (METH)ACRYLIC RESINS AND METHODS THEREOF

(71) Applicant: 3M INNOVATIVE PROPERTIES COMPANY, St. Paul, MN (US)

(72) Inventors: Amanda K. Leone, St. Paul, MN (US); Wayne S. Mahoney, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/707,288

(22) PCT Filed: Nov. 18, 2022

(86) PCT No.: PCT/IB2022/061144
§ 371 (c)(1),
(2) Date: May 3, 2024

(87) PCT Pub. No.: WO2023/111723
PCT Pub. Date: Jun. 22, 2023

(65) Prior Publication Data
US 2025/0115699 A1   Apr. 10, 2025

Related U.S. Application Data

(60) Provisional application No. 63/289,802, filed on Dec. 15, 2021.

(51) Int. Cl.
*C08F 222/24* (2006.01)
*C08F 220/18* (2006.01)
*C08F 220/20* (2006.01)
*C08F 230/02* (2006.01)

(52) U.S. Cl.
CPC ...... *C08F 222/24* (2013.01); *C08F 220/1806* (2020.02); *C08F 220/20* (2013.01); *C08F 230/02* (2013.01)

(58) Field of Classification Search
None
See application file for complete search history.

(56) References Cited

U.S. PATENT DOCUMENTS

| | | | |
|---|---|---|---|
| 3,347,954 A | 10/1967 | Hellmut et al. | |
| 5,916,987 A | 6/1999 | Kobayashi et al. | |
| 6,165,563 A | 12/2000 | Chandran et al. | |
| 8,545,225 B2 | 10/2013 | Takei et al. | |
| 9,957,408 B2 | 5/2018 | Thompson | |
| 11,535,713 B2 | 12/2022 | Bowman et al. | |
| 2001/0044555 A1* | 11/2001 | Kobayashi | C07D 333/22 560/222 |
| 2012/0238389 A1* | 9/2012 | Schoon | B60K 17/30 475/149 |
| 2015/0175723 A1 | 6/2015 | Calias et al. | |

FOREIGN PATENT DOCUMENTS

| | | |
|---|---|---|
| CN | 105018092 A | 11/2015 |
| CN | 107602432 A * | 1/2018 |
| CN | 107602432 B | 6/2019 |
| CN | 107625992 B | 5/2020 |
| CN | 107556430 B | 1/2021 |
| DE | 4219700 A1 | 12/1992 |
| EP | 0059451 B1 | 7/1985 |
| EP | 3838935 A2 | 6/2021 |
| WO | 2018039331 A1 | 3/2018 |
| WO | 2020250154 A1 | 12/2020 |

OTHER PUBLICATIONS

CN-107602432-A, 2018, Machine translation (Year: 2018).*
Chang, "Viscoelastic Windows of Pressure-Sensitive Adhesives", The Journal of Adhesion, Jun. 1991, vol. 34, No. 1-4, pp. 189-200.
International Search report for PCT International Application No. PCT/IB2020/06114, mailed on Feb. 22, 2023, 5 pages.
Khosravi, "Thermally Degradable Thermosetting Materials", European Polymer Journal, 2011, vol. 47, pp. 465-473.
Kloxin, "Covalent Adaptable Networks (CANs): A Unique Paradigm in Cross-Linked Polymers", Macromolecules, 2010, vol. 43, pp. 2643-2653.
Laurel, "Degradable Thioester Core-Crosslinked Star-Shaped Polymers", Royal Society of Chemistry, 2022, vol. 13, pp. 5579-5589.
Moore, et al., "Room Temperature Polyesterification", Macromolecules, vol. 23, (1990), pp. 65-70.
Sarac, "Redox Polymerization", Progress in Polymer Science, 1999, vol. 24, pp. 1149-1204.
Structural Adhesive Market Size Worth $31.87 Billion By 2030, retrieved from internet on Jul. 3, 2024 (date unknown but believed to be prior to date of filing of the application), URL <https://www.grandviewresearch.com/press-release/global-structural-adhesives-market> 6 Pages.
Vandenbergh, "Cross-Linked Degradable Poly(/3-Thioester) Networks Via Amine-Catalyzed Thiol-ene Click Polymerization", Polymer, 2014, vol. 55, pp. 3525-3532.
Wang, "Recyclable and Repolymerizable Thiol-X Photopolymers", Materials Horizons, 2018, vol. 5, pp. 1042-1046.
Worrell, "A User's Guide to The Thiol-Thioester Exchange in Organic Media: Scope, Limitations, And Applications in Material Science", Polymer Chemistry, 2018, vol. 9, pp. 4523-4534.
Worrell, "Bistable and Photoswitchable States of Matter", Nature Communications, 2018, vol. 9, pp. 2804/1-2804/7.

* cited by examiner

*Primary Examiner* — Satya B Sastri
(74) *Attorney, Agent, or Firm* — Julie Lapos-Kuchar

(57) ABSTRACT

Disclosed herein is a thioester-containing (meth)acrylate compound comprising at least two thioester moieties and at least 2 (meth)acrylate moieties and a method for making such compounds. These compounds can be used in (meth)acrylic resins as a crosslinking agent. Upon exposure to a nucleophilic solvent, cured (meth)acrylic resins derived from these thioester-containing (meth)acrylate compounds can be degraded.

9 Claims, No Drawings

DEGRADABLE CROSSLINKERS FOR (METH)ACRYLIC RESINS AND METHODS THEREOF

TECHNICAL FIELD

This disclosure relates to a thioester-containing (meth)acrylate compound, comprising more than one thioester moiety. Such compounds may be used to crosslink (meth)acrylic resins and then enable degradation of the crosslinked resin. Methods of making the compound and using it are disclosed herein.

SUMMARY

There is growing interest for polymers that are capable of being degraded on demand. Unpredictable changes in environmental factors like pH temperature, or ionic strength cause most biodegradable polymers to decompose at variable rates. Moreover, there is a need for polymer systems that permit users to alter the rate of degradation.

Acrylic and methacrylic polymers are used in a variety of multilayered products including adhesives, such as structural adhesive and pressure sensitive adhesives, coatings, and sealants. As sustainability and recyclability metrics become more important when developing products, it is desirable to design multilayered products that can be disassembled at end-of-life such that materials can be collected, recycled, and or re-used. Crosslinked (meth)acrylic resins are commonly used in the assembly of multilayered products because of the wide availability of monomer starting materials and the crosslinked (meth)acrylic resins have good physical properties (e.g., mechanical properties, stability against weathering, solvent resistance, and/or temperature stability). When considering durability of multilayered resins and sustainability/recyclability metrics, it is desirable to have curable (meth)acrylic resins that will degrade, but only when the user decides to decommission the product, a sort of triggered, "degrade-on-demand" (meth)acrylate-based composition.

In one embodiment, a curable composition is disclosed comprising:
(a) a mono (meth)acrylate ester monomer comprising at least 4 and no more than 20 carbon atoms;
(b) a thioester-containing (meth)acrylate crosslinking agent comprising at least two thioester moieties and at least 2 (meth)acrylate moieties; and
(c) an initiator system.

In one embodiment, the thioester-containing (meth)acrylic crosslinking agent is of formula (I)

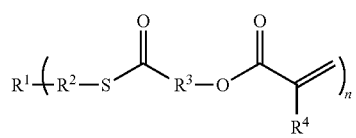

wherein:
$R^1$ is a multivalent linking group consisting of one or more of C, S, N, O, or H;
$R^2$ is a divalent alkylenyl group comprising at least 1 carbon atom and optionally comprising at least 1 ester linkage;
$R^3$ is a divalent alkylenyl group comprising at least 1 carbon atom and optionally comprising at least 1 ester linkage;
$R^4$ is a H or a methyl group; and
n is an integer of at least 2.

In another aspect, a thioester-containing (meth)acrylic compound is described. The thioester-containing (meth)acrylic compound is according to formula (I)

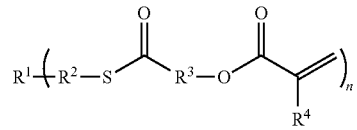

wherein:
$R^1$ is a multivalent linking group consisting of one or more of C, S, N, O, or H;
$R^2$ is a divalent alkylenyl group comprising at least 1 carbon atom and optionally comprising at least 1 ester linkage;
$R^3$ is a divalent alkylenyl group comprising at least 1 carbon atom and optionally comprising at least 1 ester linkage;
$R^4$ is a H or a methyl group; and
n is an integer of at least 2.

In another aspect, the present disclosure provides a cured (meth)acrylate composition derived from:
(a) a mono (meth)acrylate ester monomer comprising at least 4 and no more than 20 carbon atoms;
(b) a thioester-containing (meth)acrylate crosslinking agent comprising at least two thioester moieties and at least 2 (meth)acrylate moieties; and (c) an initiator system.

In another aspect, a method of degrading a (meth)acrylate composition is disclosed, the method comprising contacting a cured (meth)acrylate composition with a nucleophilic solvent, wherein the cured (meth)acrylate composition is derived from: (a) a mono (meth)acrylate ester monomer comprising at least 4 and no more than 20 carbon atoms; (b) a thioester-containing (meth)acrylate crosslinking agent comprising at least two thioester moieties and at least 2 (meth)acrylate moieties; and (c) an initiator system.

In another aspect, a method of making a thioester-containing (meth)acrylate compound comprising at least two thioester moieties and at least two (meth)acrylate moieties, the method comprising: contacting a polythiol compound with a (meth)acrylate starting material having either a pendent carboxylic acid group or a pendent acid chloride group in the presence of a carbodiimide and optionally a tertiary amine.

The above summary is not intended to describe each embodiment. The details of one or more embodiments of the disclosure are also set forth in the description below. Other features, objects, and advantages will be apparent from the description and from the claims.

DETAILED DESCRIPTION

As used herein:
"a", "an", and "the" are used interchangeably and mean one or more;
"alkyl" refers to a monovalent group that is a radical of an alkane, which is a saturated hydrocarbon. The alkyl can be linear, branched, cyclic, or combinations thereof,
"alkylenyl" refers to a divalent group that is a radical of an alkane. The alkylenyl group can be straight-chained, branched, cyclic, or combinations thereof.

"and/or" is used to indicate one or both stated cases may occur, for example A and/or B includes, (A and B) and (A or B);

"crosslinking" refers to connecting two pre-formed polymer chains using chemical bonds or chemical groups in order to increase the modulus of the material; and "(meth)acrylate" and "(meth)acrylic" are used herein to denote the corresponding acrylate and methacrylate. For instance, "(meth)acrylate" refers to compounds containing either an acrylate ($CH_2$=CHCOO—) or a methacrylate ($CH_2$=$CCH_3$COO—) structure or mixtures thereof.

Also herein, recitation of ranges by endpoints includes all numbers subsumed within that range (e.g., 1 to 10 includes 1.4, 1.9, 2.33, 5.75, 9.98, etc.).

Also herein, recitation of "at least two" includes all numbers of two and greater (e.g., at least 4, at least 6, at least 8, at least 10, at least 25, at least 50, at least 100, etc.).

Also herein, recitation of "at least one" includes all numbers of one and greater (e.g., at least 2, at least 4, at least 6, at least 8, at least 10, at least 25, at least 50, at least 100, etc.).

As used herein, "comprises at least one of" A, B, and C refers to element A by itself, element B by itself, element C by itself, A and B, A and C, B and C, and a combination of all three.

In the present disclosure, it has been found that a thioester-containing (meth)acrylate compound comprising at least two thioester moieties and at least two (meth)acrylate moieties can be used to crosslink (meth)acrylic resins and also facilitate their subsequent degradation.

The thioester-containing (meth)acrylate compounds of the present disclosure are those which comprise at least two thioester moieties (i.e., —C(=O)S—) and at least 2 (meth) acrylate moieties.

In one embodiment, the thioester-containing (meth)acrylate compounds of the present disclosure are of the formula (I):

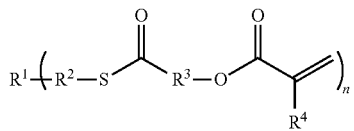

wherein:

$R^1$ is a multivalent linking group consisting of one or more of C, S, N, O, or H;

$R^2$ is a divalent alkylenyl group comprising at least 1 carbon atom and optionally comprising at 1 ester linkage (i.e., —C(=O)O—);

$R^3$ is a divalent alkylenyl group comprising at least 1 carbon atom and optionally comprising at least 1 ester linkage;

$R^4$ is a H or a methyl group; and n is an integer of at least 2.

$R^1$ is multivalent and comprises only C, S, N, O, and H atoms. $R^1$ may comprise only one type of atom (e.g., only C), more than one type of atom (e.g., C and H), or all of the atoms (e.g., C, S, N, O, and H), which will be further exemplified below.

In one embodiment, $R^1$ is $X^1L^1_m$, where $X^1$ is C, N, O, or S; $L^1$ is an alkyl group; and m is an integer. $L^1$ is a hydrocarbon group that may be linear or branched and comprises 1, 2, 3, 4, 5, 6, 7, or 8 carbon atoms. When $X^1$ is C, n in formula (I) is 2, 3, or 4 and m+n=4. When $X^1$ is N, n in formula (I) is 2 or 3, and m+n=3. When $X^1$ is O or S, n in formula (I) is 2 and m is 0.

In one embodiment, $R^1$ comprises a cyclic group and n in formula (I) is 2, 3, 4, 5, or even 6. The cyclic group may be saturated or unsaturated. The cyclic group may comprise heteroatoms such as N, O, and/or S. In one embodiment, at least one nitrogen atom forms a vertex of the ring. $R^1$ may comprise one or more rings with each ringed structure typically comprising 5 or 6 atoms forming the individual ring(s). If $R^1$ comprises 2 or more rings, the rings may be fused together (such as glycoluril, or naphthylenyl) or may not be fused together (such as biphenyl). In one embodiment, $R^1$ is derived from a glycoluril, a cyanuric acid, or a benzene structure.

In one embodiment, $R^1$ is of the divalent structure —$X^2L^2X^2$— and n in formula (I) is 2. Each $X^2$ is independently selected from S or O. $L^2$ is a bond or a divalent alkylenyl group. The divalent alkylenyl group may be linear or branched comprising 1, 2, 3, 4, 5, 6, 7, or even 8 carbon atoms and optional heteroatoms selected from S and O. Exemplary $R^1$ structures include —S—S—; and —O—$(CH_2)_p$—O— where p is an integer from 1-4.

In yet another embodiment, $R^1$ is of the multivalent structure —$C(X^3)_mL^3C(X^4)_p$— and n in formula (I) is an integer from 2 to 6, or even 4 to 6. $X^3$ and $X^4$ are independently a linear or branched alkyl group. $L^3$ is divalent group comprising a S or O atom. m and p are independently selected from 0, 1 or 2, wherein p+m+n=6. Exemplary $R^1$ structures include

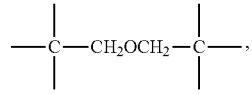

wherein each end carbon is connected to three independently selected $R^2$ groups.

$R^2$ typically comprises at least 1, 2, 3, 4, 5, or 6 in-chain carbons. For example, $R^2$ may be methylene, ethylene, n-propylene, or n-butylene. In some embodiments, $R^2$ comprises at 1 ester linkage. Typically, there is one to three methylene units between each ester group. Exemplary $R^2$ groups include: —$(CH_2)$—; —$(CH_2)_2$—; —$(CH_2)_3$—; —$(CH_2)_2OC(=O)CH_2$—; —$(CH_2)_2OC(=O)CH_2CH_2$—; and —$(CH_2)OC(=O)CH_2CH_2$—.

$R^3$ typically comprises at least 1, 2, 3, or 4 in-chain carbons. For example, $R^3$ may be methylene, ethylene, n-propylene, or n-butylene. In some embodiments, $R^3$ comprises at least 1 ester linkage. Typically, there is one to three methylene units between each ester group. Exemplary $R^3$ groups include: —$(CH_2)_2C(=O)OCH_2$—; —$(CH_2)_2C(=O)O(CH_2)_2$—; and —$CH_2C(=O)O(CH_2)_2$—.

The subscript n represents the number of [—$R^2S(=O)R^3OC(=O)CR^4$=$CH_2$] groups present in the thioester-containing (meth)acrylate of the present disclosure. The subscript n is at least 2 and at most the number of open valences available for $R^1$. For example, if $R^1$ was a carbon atom, carbon has a valency of 4, therefore n can only be 4, but if the carbon atom has one methyl group, then n would only be 3. Typically, the [—$R^2S(=O)R^3OC(=O)CR^4$=$CH_2$] groups are identical, but if more than one type of (meth)acrylate compound is used during the synthesis described below, mixed groups can occur.

Exemplary thioester-containing (meth)acrylate compounds of the present disclosure include the following:
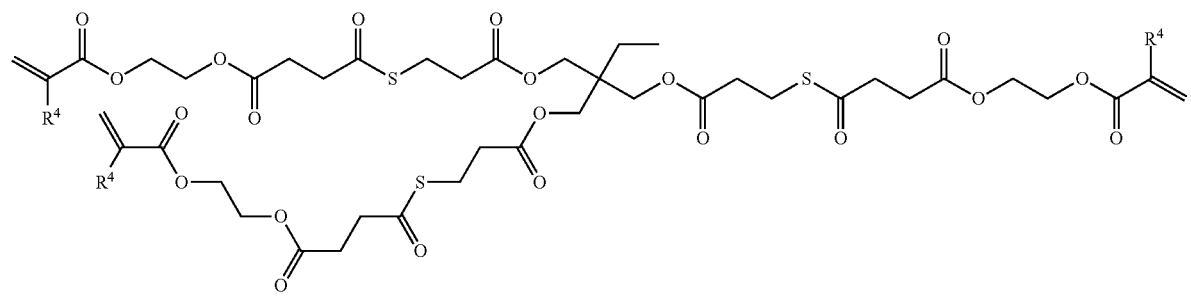
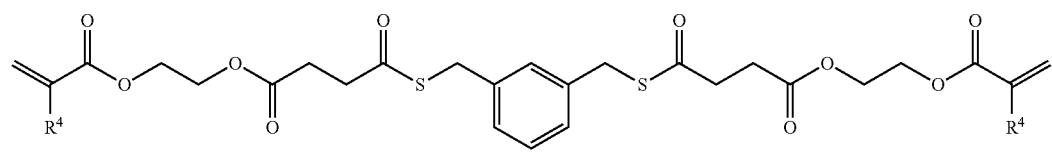
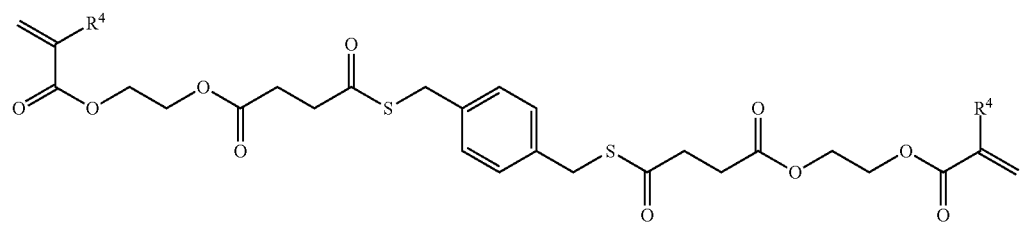
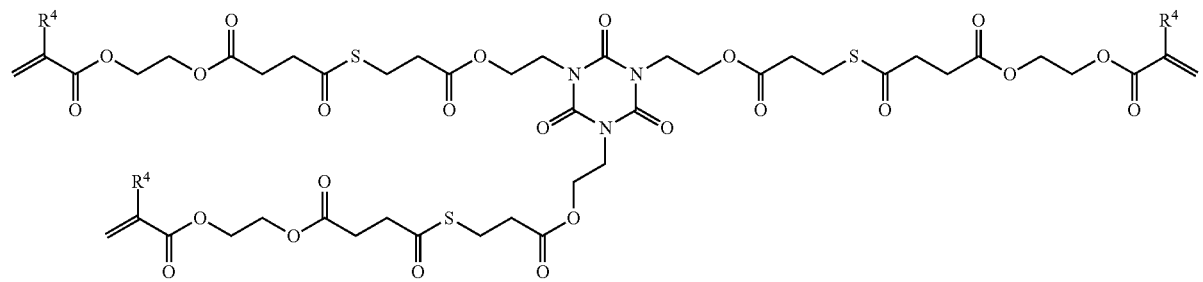
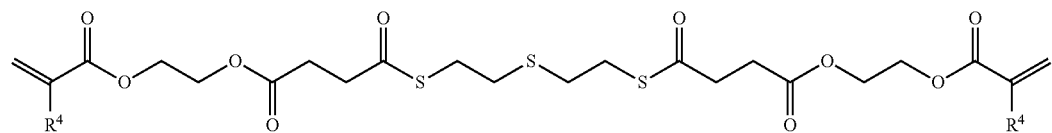
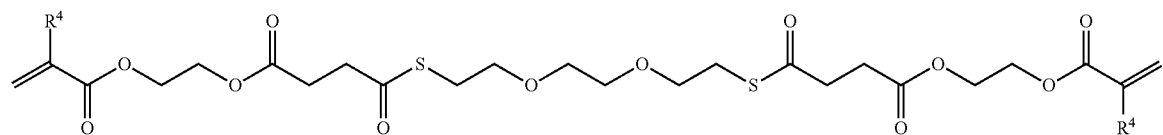

-continued
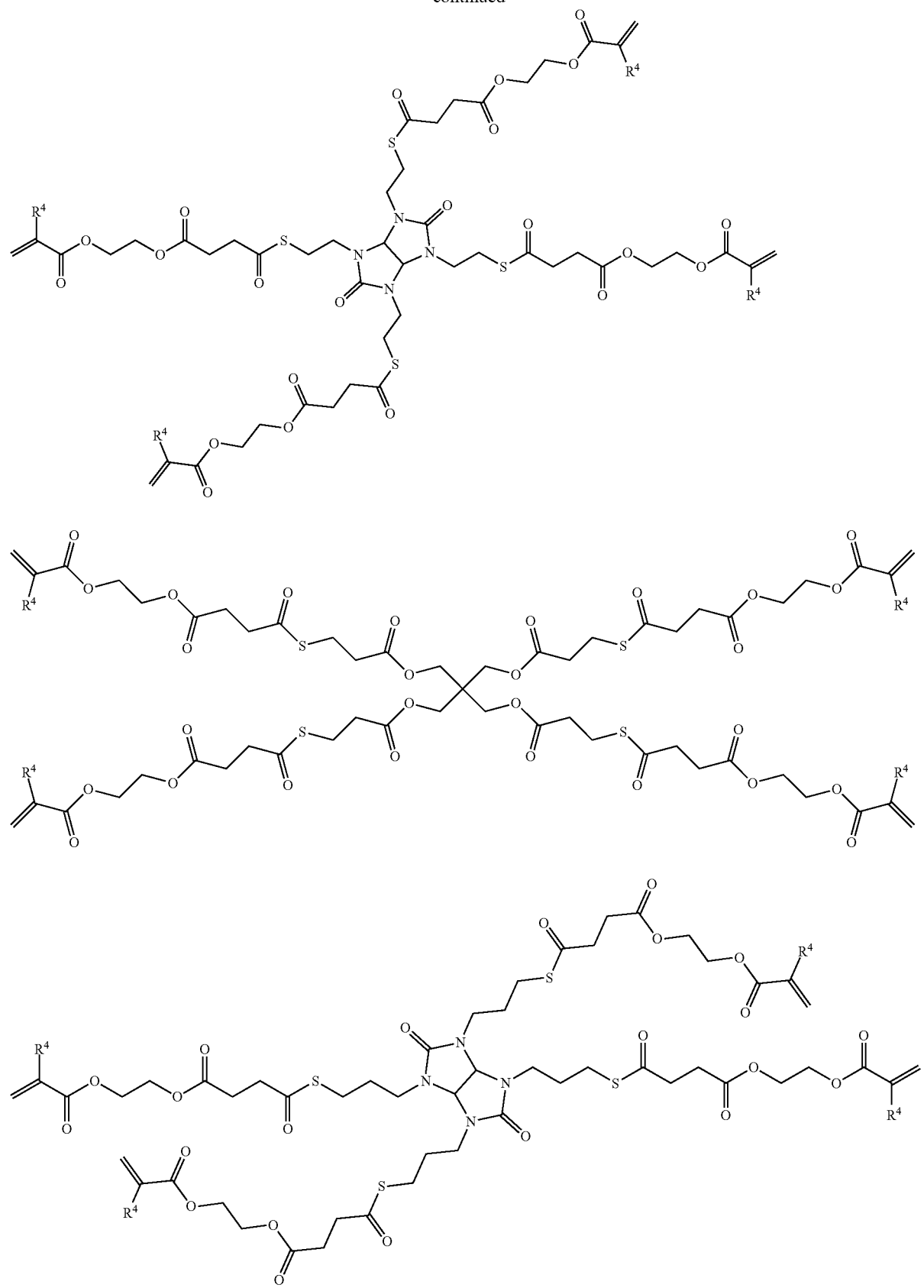
and

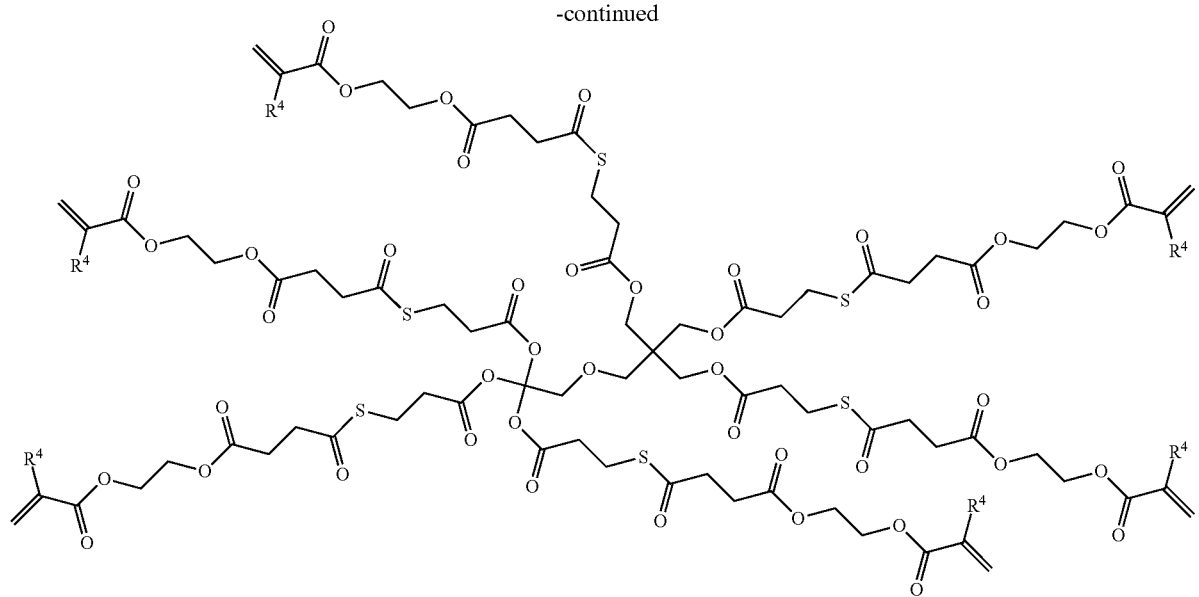

Where R⁴ is H or a methyl group.

The thioester-containing (meth)acrylate compounds of the present disclosure may be prepared using a polythiol compound and a (meth)acrylate starting material compound having a pendent carboxylic acid group or acid chloride group. The reaction occurs in the presence of a carbodiimide and optionally a tertiary amine using the procedure described below.

In one embodiment, the polythiol compound comprises at least two thiol (i.e., —SH) groups. In some embodiments, the polythiol compound comprises more than two thiol groups, for example, 3, 4 or even 6 thiol groups. The thiol group reacts with the carboxylic acid or acid chloride portion of the (meth)acrylate compound forming the —S—C(=O)— portion of formula (I). In one embodiment, the polythiol compound is according to formula (II): $R^1$—$(R^2$—$SH)_n$, where $R^1$, $R^2$, and n are the same as disclosed above for formula (I). Exemplary commercially available polythiol compounds include:

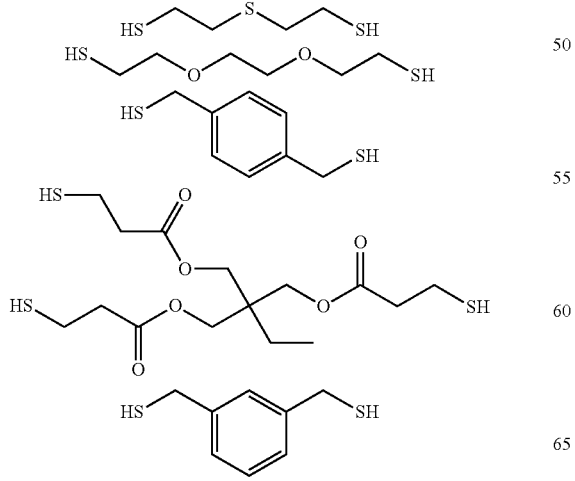

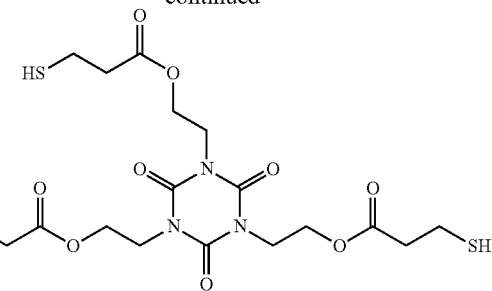

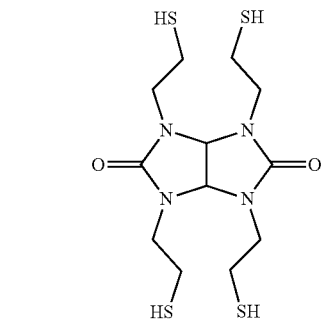

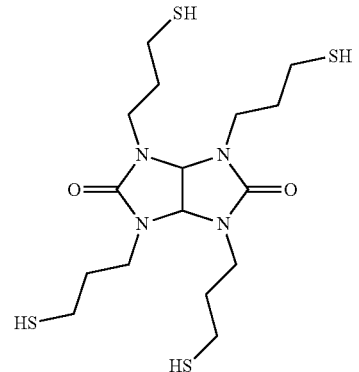

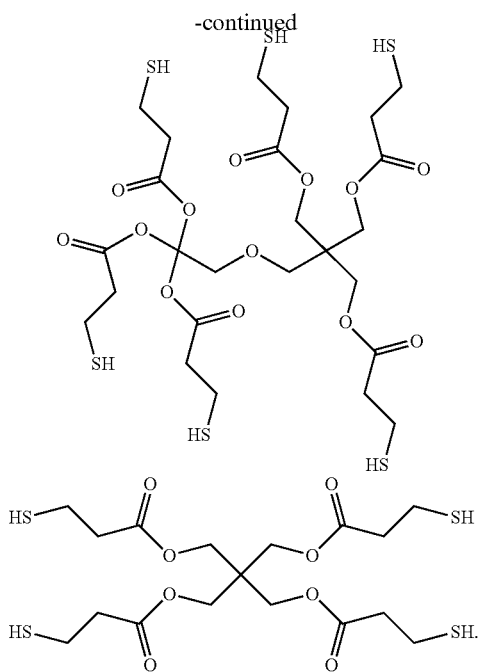

The (meth)acrylate starting material has a (meth)acrylate moiety and a pendent carboxylic acid or acid chloride group. In one embodiment, the (meth)acrylate starting material is according to formula (IIIA) HOC(=O)R$^3$—O—C(=O)CR$^4$=CH$_2$ or (IIIB) ClC(=O)R$^3$—O—C(=O)CR$^4$=CH$_2$, where R$^3$, and R$^4$ are the same as disclosed above for formula (I) above. Exemplary (meth)acrylate starting materials include: CH$_2$=CHC(=O)O(CH$_2$)$_2$C(=O)OH, CH$_2$=CHC(=O)O(CH$_2$)$_2$OC(=O)(CH$_2$)$_2$C(=O)OH, CH$_2$=C(CH$_3$)C(=O)O(CH$_2$)$_2$C(=O)OH, and CH$_2$=C(CH$_3$)C(=O)O(CH$_2$)$_2$OC(=O)(CH$_2$)$_2$C(=O)OH.

The polythiol compound is reacted with the (meth)acrylate starting material having a pendent carboxylic acid or acid chloride group in the presence of a carbodiimide and optionally a tertiary amine.

The tertiary amine and carbodiimide can include those known in the art. Exemplary tertiary amines include: 4-dimethylaminopyridinium 4-toluenesulfonate, 4-dimethylaminopyridine, ethyl-4-dimethylamino benzoate, and combinations thereof. Exemplary carbodiimides include: diisopropylcarbodiimide, (N-(3-dimethylaminopropyl)-N'-ethylcarbodiimide), and combinations thereof.

In one embodiment, the ratio of the polythiol compound to the (meth)acrylate starting material is such that the number of moles of the (meth)acrylate starting material is equal to the number of moles of thiol groups in the polythiol compound. In some embodiments, a slight excess of the (meth)acrylate starting material is used to ensure each thiol is consumed. Typically, the reaction is conducted at a temperature of between −10° C. to at most 50° C. and solvents (such as ethyl acetate, dichloromethane, or toluene) are used. Once the reaction has gone to completion, the resulting thioester-containing (meth)acrylate compounds is collected and typically separated from the generated urea before use.

The thioester-containing (meth)acrylate compounds of the present disclosure can act as crosslinking agents in curable compositions, these compounds as used in the curable compositions are referred to herein as a thioester-containing (meth)acrylate crosslinking agent.

The curable composition of the present disclosure is (meth)acrylate-based and comprises a polymerizable monofunctional (meth)acrylate ester monomer.

Useful monofunctional (meth)acrylic esters include at least one monomer selected from the group consisting of a monofunctional (meth)acrylate ester derived from a linear, branched, or cyclic alkyl alcohol, the alkyl group of which comprises at least 4, 5, 6, 7, 8 or even 10 carbon atoms; and at most 14, 16, 18 or even 20 carbon atoms. In one embodiment, the monofunctional (meth)acrylate ester monomer is $C_4$ to $C_{20}$.

Exemplary monofunctional (meth)acrylate ester monomers useful in embodiments of the present disclosure include 2-phenoxyethyl (meth)acrylate, cyclohexyl (meth)acrylate, benzyl (meth)acrylate, isobornyl (meth)acrylate, acid-functional monomers, alkoxylated lauryl (meth)acrylate, alkoxylated phenol (meth)acrylate, alkoxylated tetrahydrofurfuryl (meth)acrylate, caprolactone (meth)acrylate, cyclic trimethylolpropane formyl (meth)acrylate, ethylene glycol methyl ether methacrylate, ethoxylated nonyl phenol (meth)acrylate, isodecyl (meth)acrylate, isooctyl (meth)acrylate, lauryl (meth)acrylate, octadecyl (meth)acrylate (stearyl (meth)acrylate), tetrahydrofurfuryl (meth)acrylate, tridecyl (meth)acrylate, tetrahydrofurfuryl (meth)acrylate, allyl (meth)acrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2- and 3-hydroxypropyl (meth)acrylate, 2-methoxyethyl(meth)acrylate, 2-ethoxyethyl (meth)acrylate, 2- or 3-ethoxypropyl (meth)acrylate, 2-(2-ethoxyethoxy)ethyl (meth)acrylate, glycidyl (meth)acrylate, phosphonate-functional (meth)acrylate monomers (for example, the SIPOMER PAM resins from Solvay Specialty Polymers USA, LLC).

In one embodiment, the curable composition comprises at least one monofunctional (meth)acrylate ester monomer compound present in 0.01 to 99% by weight, 1 to 75% by weight, 10 to 50% by weight, or even 5 to 30% by weight based on the total weight of the polymerizable monomers.

In addition to the mono (meth)acrylate ester monomer, other free-radically polymerizable monomers or compounds that can be copolymerized with free-radically polymerizable monomers, may be used. Examples of free-radically polymerizable compounds or copolymerizable compounds include, ethylenically unsaturated compounds such as (meth)acrylates, (meth)acrylamides, vinyl ethers (e.g., methyl vinyl ether and ethyl vinyl ether), vinyl esters (e.g., vinyl acetate and vinyl propionate), vinyl halides, styrene and substituted styrenes (e.g., α-methylstyrene and divinylstyrene), N-vinylamides (e.g., N-vinylformamide, N-vinylacetamide, and also including N-vinyl lactams such as N-vinylpyrrolidone and N-vinylcaprolactam), maleimides, and allyl and/or vinyl compounds (e.g., allylic alkenes, (e.g., propene, isomers of butene, pentene, hexene up to dodecene, isoprene, and butadiene)), and combinations thereof. The ethylenically-unsaturated, free radically polymerizable or copolymerizable monomers may be polar, non-polar, siloxane-functional (meth)acrylates, acid-functional, and the like, and combinations thereof.

Polar ethylenically unsaturated monomers may be included to tailor properties to the specific application, such as adhesion to a particular substrate. Exemplary polar ethylenically unsaturated monomers include: 2-hydroxyethyl methacrylate, hydroxypropyl methacrylate, 4-hydroxybutyl (meth)acrylate, tetrahydrofurfuryl (meth)acrylate, N-(2-(2- oxo-1-imidazolidinyl)ethyl)-meth acrylamide (methacrylamidoethyl ethyleneurea) ("MAEEU"), methacrylamide, N,N-dimethylacrylamide, N,N-dimethylacetamide, 2-dimethylaminoethyl methacrylate, 3-dimethylaminopropyl methacrylamide, poly(propylene glycol) (meth)acrylate; glycerol mono- or di-(meth)acrylate; trimethylolpropane mono- or di-(meth)acrylate; pentaerythritol mono-, di-, and tri-(meth)acrylate; sorbitol mono-, di-, tri-, tetra-, or penta (meth)acrylate; and 2,2-bis[4-(2-hydroxy-3-methacryloxypropoxy)phenyl]propane (bisGMA), 2-isocyanatoethyl methacrylate, 2-(1,2-cyclohexadienyldicarboximide)ethyl methacrylate (MIRAMER M1089), and the like, and combinations thereof.

If present, in one embodiment, the curable composition comprises at least one polar ethylenically unsaturated monomer compound present in 0.01 to 99% by weight, 1 to 75% by weight, 10 to 50% by weight, or even 5 to 30% by weight based on the total weight of the polymerizable monomers.

Non-polar ethylenically unsaturated monomers may be included to tailor properties to the specific application, such as adhesion to a particular substrate. Exemplary non-polar ethylenically unsaturated monomers include: isophoryl (meth)acrylate, t-butylcyclohexyl (meth)acrylate, cyclohexyl (meth)acrylate, methyl (meth)acrylate, ethyl (meth) acrylate, 2-phenoxyethyl (meth)acrylate, benzyl (meth)acrylate, isobornyl (meth)acrylate, lauryl (meth)acrylate, stearyl (meth)acrylate, behenyl (meth)acrylate, t-butyl (meth)acrylate, isodecyl (meth)acrylate, tridecyl (meth)acrylate, dicyclopentenyloxyethyl (meth)acrylate, dicyclopentanyl (meth) acrylate, difunctional tricyclodecanedimethanol di(meth) acrylate, or combinations thereof.

If present, in one embodiment, the curable composition comprises at least one non-polar ethylenically unsaturated monomer compound present in 0.01 to 99% by weight, 1 to 75% by weight, 10 to 50% by weight, or even 5 to 30% by weight based on the total weight of polymerizable monomers.

Exemplary acid-functional monomers include: (meth) acrylic acid, phosphonate-functional (meth)acrylate monomers (for example, those available under the trade designation SIPOMER PAM from Solvay Specialty Polymers USA, LLC), carboxylic acid-terminated (meth)acrylate monomers (for example, β-methacryloyl oxyethyl hydrogen succinate), phthalic acid monoethyl methacrylate, 2-(methacroyloxy) ethyl maleate, itaconic acid, fumaric acid, crotonic acid, citraconic acid, maleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

If present, in one embodiment, the curable composition comprises at least one acid-functional ethylenically unsaturated monomer compound present in 0.01 to 10% by weight, 0.5 to 5% by weight, or even 2 to 4% by weight based on the total weight of polymerizable monomers.

In one embodiment, a curable composition comprises at least 3, 5, or even 7% by weight of the thioester-containing (meth)acrylate disclosed herein. In one embodiment, a curable composition comprises at most 50, 40, 30, 20, 15, or even 10% by weight of the thioester-containing (meth) acrylate disclosed herein.

In one embodiment, the curable composition may comprise a second crosslinking agent in addition to the thioester-containing (meth)acrylate crosslinking agent disclosed herein. These additional crosslinking agents can be multifunctional ethylenically unsaturated monomers comprising 2 to 6 ethylenically unsaturated groups. Exemplary multifunctional ethylenically unsaturated monomers include: tricyclodecanedimethanol di(meth)acrylate, 1,3 butylene glycol di(meth)acrylate, 1,3-propanediol di(meth)acrylate, 1,4-butanediol di(meth)acrylate, 1,4-cyclohexanediol di(meth) acrylate, 1,6-hexanediol di(meth)acrylate, caprolactone modified neopentyl glycol hydroxypivalate di(meth)acrylate, cyclohexanedimethanol di(meth)acrylate, diethylene glycol di(meth)acrylate, dipropylene glycol di(meth)acrylate, ethoxylated bisphenol A di(meth)acrylates, 2-(acryloyloxy)ethyl 4-((3-(2-(acryloyloxy)ethoxy)-3-oxopropyl) thio)-4-oxobutanoate (or TEDA). (Meth)acrylate functional oligomers may also be used such as, polyester (meth) acrylates, polyurethane (meth)acrylates, and (meth)acrylated epoxy (meth)acrylates. Urethane (meth)acrylate oligomer(s) may also be used such as, aromatic urethane acrylates, aliphatic urethane acrylates, aromatic/aliphatic urethane acrylates and combinations thereof. Many urethane (meth)acrylate oligomer(s) are available commercially from suppliers such as Arkema, King of Prussia, Pennsylvania.

If used, in one embodiment, the curable composition comprises at least one multifunctional ethylenically unsaturated monomer present in 0.01 to 60% by weight, 1 to 20% by weight, 1 to 10% by weight, or even 3 to 8% by weight based on the total weight of polymerizable monomers.

In one embodiment, the curable composition comprises a chain transfer agent. Exemplary chain transfer agents include isooctyl 3-mercaptopropionate (IOTG), tert-nonyl mercaptan, and 4-methylbenzenethiol.

The curable composition further comprises an initiator system.

In some embodiments, the initiator system is a redox initiator system, as one-electron transfer redox reactions may be an effective method of generating free radicals under mild conditions. Redox initiator systems have been described, for example, in Prog. Polym. Sci. 24 (1999) 1149-1204.

In some embodiments, the redox initiator system is a blend of a peroxide with an amine, where the polymerization is initiated by the decomposition of the organic peroxide activated by the redox reaction with amine reducing agent. Typically, the peroxide is benzoyl peroxide, and the amine is a tertiary amine. Aromatic tertiary amines are the most effective compounds to generate the primary radicals, with NN-dimethyl-4-toluidine ("DMT") being the most common amine reducing agent.

In some embodiments, the redox initiator system comprises a barbituric acid derivative and a metal salt. In some embodiments, the barbituric acid/metal salt initiator system may further comprise an organic peroxide, an ammonium chloride salt (e.g., benzyl tributylammonium chloride), or a mixture thereof.

Examples of initiator systems based on barbituric acid include redox initiator systems having (i) a barbituric acid derivative and/or a malonyl sulfamide, and (ii) an organic peroxide, selected from the group consisting of the mono- or multifunctional carboxylic acid peroxide esters. There can be used as barbituric acid derivatives described in U.S. Pat. No. 3,347,954 (Bredereck et al.) and U.S. Pat. No. 9,957,408 (Thompson), for example, 1-benzyl-5-phenylbarbituric acid, 1-cyclohexyl-5-ethylbarbituric acid, and the thiobarbituric acids mentioned in the German patent application DE-A-42 19 700, as well as the malonyl sulfamides disclosed in the European patent specification EP-B-0 059 451, may be useful in embodiments of the present disclosure.

The barbituric acid-based redox initiator systems typically contain mono- or multifunctional carboxylic acid peroxyesters as organic peroxides. Carbonic peroxyesters are also included among the multifunctional carboxylic acid peroxyesters within the meaning of the present disclosure. Suitable examples include tert-butylperoxy 2-ethylhexyl carbonate, and tert-butyl 3,5,5-trimethylhexaneperoxoate.

Metal salts that may be used with the barbituric acid derivative can include transition metal complexes, especially salts of cobalt, manganese, copper, iron, and combinations thereof. When the metal salt is a copper compound, the salt may possess the general formula $CuX_n$, where X is an organic and/or inorganic anion and n=1 or 2. Examples of suitable copper salts include copper chloride, copper acetate, copper acetylacetonate, copper naphthenate, copper salicylate or complexes of copper with thiourea or ethylenediaminetetraacetic acid, and mixtures thereof. In some embodiments copper naphthenate is particularly preferred.

Another redox initiator system suitable for use in embodiments of the present disclosure comprises an inorganic peroxide, an amine-based reducing agent, and an accelerator, where the amine may be an aromatic and/or aliphatic amine, and the polymerization accelerator is at least one selected from the group consisting of sodium benzenesulfinate, sodium p-toluenesulfinate, sodium 2,4,6-trisopropyl benzenesulfinate, sodium sulfite, potassium sulfite, calcium sulfite, ammonium sulfite, sodium bisulfate, and potassium bisulfate. An example of an inorganic peroxide useful in this system is peroxodisulfate as described in U.S. Pat. No. 8,545,225 (Takei, et al.).

In some embodiments, the initiator system comprises at least one photoinitiator, meaning that the initiator is activated by light, generally ultraviolet (UV) light, although other light sources could be used with the appropriate choice of initiator, such a visible-light initiator, infrared-light initiators, and the like. Typically, UV photoinitiators are used.

Useful photoinitiators include those known as useful for photocuring free-radically polyfunctional (meth)acrylates. Exemplary photoinitiators include benzoin and its derivatives such as alpha-methylbenzoin; alpha-phenylbenzoin; alpha-allylbenzoin; alpha benzylbenzoin; benzoin ethers such as benzil dimethyl ketal, benzoin methyl ether, benzoin ethyl ether, benzoin n-butyl ether; acetophenone and its derivatives such as 2-hydroxy-2-methyl-1-phenyl-1-propanone and 1-hydroxycyclohexyl phenyl ketone; 2-methyl-1-[4-(methylthio)phenyl]-2-(4-morpholinyl)-1-propanone; 2-benzyl-2-(dimethylamino)-1-[4-(4-morpholinyl)phenyl]-1-butanone and phosphine oxide derivatives such as ethyl-(2,4,6-trimethylbenzoyl)-phenyl phosphinate, and bis-(2,4,6-trimethylbenzoyl)-phenylphosphine oxide.

Other useful photoinitiators include, for example, pivaloin ethyl ether, anisoin ethyl ether, anthraquinones, halomethyltriazines, benzophenone and its derivatives, iodonium salts and sulfonium salts, titanium complexes such as bis (eta5-2,4-cyclopentadien-1-yl)-bis[2,6-difluoro-3-(1H-pyrrol-1-yl)phenyl]titanium; halomethyl-nitrobenzenes, and combinations of photoinitiators where one component is a mono- or bis-acylphosphine oxide.

Generally, the photoinitiator is used in amounts of 0.01 to 10% by weight, more typically 0.1 to 2.0, % by weight relative to 100 parts by weight of total reactive components.

The components of the initiator system are present in the curable composition in amounts sufficient to permit an adequate free-radical reaction rate of curing of the curable composition upon initiation of polymerization, amounts which may be readily determined by one of ordinary skill in the relevant arts. In embodiments of the present disclosure, the curable composition commonly comprises 0.1% by weight to 10% by weight or 0.5% by weight to 5% by weight of the initiator system.

Additives can be included in the curable compositions before polymerization or added at the time of coating the curable composition. Additives may include, for example, tackifiers, plasticizers, dyes, pigments, antioxidants, UV stabilizers, corrosion inhibitors, dispersing agents, wetting agents, adhesion promotors, and fillers.

Fillers useful in embodiments of the present disclosure include, for example, fillers selected from the group consisting of a micro-fibrillated polyethylene, a fumed silica, a talc, a wollastonite, an aluminosilicate clay (e.g., halloysite), phlogopite mica, calcium carbonate, kaolin clay, metal oxides (e.g., barium oxide, calcium oxide, magnesium oxide, zirconium oxide, titanium oxide, zinc oxide), nanoparticle fillers (e.g. nanosilica, nanozirconia), and combinations thereof.

The curable compositions of the present disclosure may be cured by techniques known in the art. As used herein, cured may refer to partially cured (meaning that the composition can be further cured) or fully cured.

The cured articles comprising the thioester-containing (meth)acrylate compound of the present disclosure can be an adhesive, a coating, or a sealant.

In one embodiment, the curable composition is cured and forms a thermoset. In a thermoset, when the cured composition is evaluated using dynamic mechanical analysis (DMA) by ASTM D5026-15, the cured composition will exhibit a plateau region above the glass transition temperature because it is crosslinked. The glass transition temperature of the composition is identified by the temperature where the maximum tan(delta) occurs. The tan(delta) is defined as the ratio of the loss modulus to the storage modulus. The plateau region is defined as the portion of the thermogram, where the storage modulus of the cured composition as a function of temperature is nearly constant in the region above the glass transition temperature. The plateau region is described in Mechanical Properties of Polymers and Composites Second Edition, L. L. Faulkner (editor), Chapter 4, 1994.

In one embodiment, the curable composition is cured and forms a pressure sensitive adhesive composition. In one embodiment, the pressure sensitive adhesive has a viscoelastic window as defined by E. P. Chang, J. Adhesion, vol. 34, pp. 189-200 (1991) such that the dynamic mechanical properties of the pressure sensitive adhesive composition as measured by well-known techniques fall within the following ranges measured at 25° C.: G' (storage modulus) measured at an angular frequency of 0.01 rad/s is greater than $1 \times 10^3$ Pa; G' measured at an angular frequency of 100 rad/s is less than $1 \times 10^6$ Pa; G" (loss modulus) measured at an angular frequency of 0.01 rad/s is greater than $1 \times 10^3$ Pa; and G" measured at an angular frequency of 100 rad/s is less than $1 \times 10^6$ Pa.

Advantageously, the cured articles derived from the thioester-containing (meth)acrylate compound of the present disclosure can be degraded by exposure to a nucleophilic solvent.

In one embodiment, the nucleophilic solvent is a solvent having a nucleophilic functional group. Exemplary nucleophilic solvents include hexylamine, ethanolamine, dodecylamine, amylamine, benzylamine, octylamine, butylamine or combinations thereof.

In another embodiment, the nucleophilic solvent comprises a nucleophilic compound added to a solvent, wherein the solvent may or may not inherently be nucleophilic. Exemplary nucleophilic compounds include hydroxide salts (such as sodium hydroxide, calcium hydroxide, potassium hydroxide). Exemplary solvents, which are not inherently nucleophilic include those known in the art such as ethyl acetate, water, pentane, hexanes, cyclohexane, acetone, methyl ethyl ketone, propylene glycol methyl ether, ethylene glycol, methanol, ethanol, isopropanol, toluene, dichloromethane, dichloroethane, and tetrahydrofuran.

In yet another embodiment, the nucleophilic solvent comprises a reaction product of a thiol and a base in a solvent, wherein the solvent may or may not inherently be nucleophilic. Exemplary thiols include n-octyl mercaptan, n-dodecyl mercaptan, isooctyl 3-mercaptopriopionate (IOTG), and 4-methylbenzenethiol. Exemplary bases include triethyl amine, 1,8-diazabicyclo(5.4.0)undec-7-ene (DBU), and 1,5-diazabicyclo(4.3.0)non-5-ene (DBN). Exemplary solvents, which are not inherently nucleophilic include those known in the art such as ethyl acetate, water, pentane, hexanes, cyclohexane, acetone, methyl ethyl ketone, propylene glycol methyl ether, ethylene glycol, methanol, ethanol, isopropanol, toluene, dichloromethane, dichloroethane, and tetrahydrofuran.

Typically, the cured articles are contacted with the nucleophilic solvent for at least 0.5, 1, 2, 5, 10 or even 15 minutes; and at most 0.5, 1, 2, 3, or even 5 days. However, the time to degrade the cured (meth)acrylate resin may varying depending on thickness of the resin, its crosslinking density, the surface area of the cured composition that is contacted with the nucleophilic solvent, and whether or not additional interventions were used to accelerate the degradation reaction, such as heat and/or agitation. Degradation of the cured (meth)acrylate resin composition may be observed by visual examination (e.g., changes in appearance and/or dissolution of the resin), physical examination (e.g., ability to separate lays fixedly attached with the cured (meth)acrylate resin, and/or testing of the cured (meth)acrylate resin. In one embodiment, when the initial cured composition is compared to the identical cured composition after subjecting to a nucleophic solvent, there is a shift in the glass transition temperature (Tg) to lower temperature and/or an increase in the amplitude of the tan(delta) peak after contacting with the nucleophilic solvent observable by DMA.

Examples

Unless otherwise noted, all parts, percentages, ratios, etc. in the Examples and the rest of the specification are by weight. Unless otherwise indicated, all other reagents were obtained, or are available from fine chemical vendors such as MilliporeSigma, Burlington, MA, or may be synthesized by known methods. Table 1 (below) lists materials used in the examples and their sources.

The following abbreviations are used herein hr=hour, g=gram, mL=milliliter, mg=milligram, s=second, v=volume, stdv=standard deviation

TABLE 1

Materials List

| DESIGNATION | DESCRIPTION | SOURCE |
|---|---|---|
| 4HBA | 4-hydroxybutyl acrylate | TCI America Inc., Tokyo, Japan |
| ACN | acetonitrile | MilliporeSigma, Burlington, MA |
| Beads 0.5 mil | 8-12 um Solid Soda Lime Glass Microspheres (2.5 g/cc) obtained as P2015SL-2.5 | Cospheric Precision Spherical Particles, Santa Barbara, CA |
| Beads 6 mil | Spacer beads, 6 mil (0.15 mm), obtained as ENVIROSPHERES SL300 | Palmer Holland, North Olmsted, OH |
| BHT | butylated hydroxytoluene | Acros Organics, Fair Lawn, NJ |
| BYMD | Acrylonitrile butadiene rubber obtained as BAYMOD 34.52 | Arlanxeo, Maastricht, Netherlands |
| CHMA | cyclohexyl methacrylate | MilliporeSigma |
| DABCO | 1,4-diazabicyclo[2.2.2]octane | MilliporeSigma |
| DBU | 1,8-diazabicycloundec-7-ene | MilliporeSigma |
| DCC | dicyclohexyl carbodiimide | Alfa Aesar, Ward Hill, MA |
| DCM | dichloromethane | MilliporeSigma |
| DCM | methylene dichloride | MilliporeSigma |
| DIC | diisopropylcarbodiimide | MilliporeSigma |
| DMAP | 4-dimethylaminopyridine | Acros Organics |
| DPTS | 4-dimethylaminopyridinium 4-toluenesulfonate | Prepared as described in Macromolecules 1990, 23, 65-70 |
| DRGNITE | Halloysite clay additive obtained as DRAGONITE | Applied Minerals, New York, NY |
| EPXIEM | polymeric crosslinker | Prepared as described in Preparative Example 1 of WO2020/250154 |
| ESS50F | fibrillated high-density polyethylene fibers, obtained as SHORT STUFF ESS50F | MiniFibers, Johnson City, TN |
| Ethyl acetate | ethyl acetate | MilliporeSigma |
| EtOH | ethanol | MilliporeSigma |
| H18 | Pyrogenic Silica obtained as HDK H18 | Wacker Chemie, Munich, Germany |
| HCl | hydrochloric acid | Millipore Sigma |
| HEA | 2-hydroxyethyl acrylate | MilliporeSigma |
| HEMA | hydroxy ethyl methacrylate | TCI America Inc. |
| Hexanes | hexanes | MilliporeSigma |
| IOTG | isooctyl thioglycolate | MilliporeSigma |
| M1088 | acrylate monomer obtained as M1088 | Miwon Specialty Chemical, Gwanggyo, South Korea |
| M1089 | methacrylate monomer obtained as M1089 | Miwon Specialty Chemical |

TABLE 1-continued

Materials List

| DESIGNATION | DESCRIPTION | SOURCE |
|---|---|---|
| MEHQ | 4-methoxyphenol | MilliporeSigma |
| MEK | methyl ethyl ketone | MilliporeSigma |
| $MgSO_4$ | magnesium sulfate | MilliporeSigma |
| NK-Ester A-SA | carboxylic acid terminated acrylate monomer obtained as NK-Ester ASA | Kowa American Corporation, New York, NY |
| NK-Ester SA | carboxylic acid terminated methacrylate monomer obtained as NK Ester SA | Kowa American Corporation |
| PAM 200 | phosphate esters of PPG monomethacrylate, obtained as SIPOMER PAM 200 | Solvay Novacure, Cranbury, NJ |
| PETMP | pentaerythritol tetrakis (3-mercaptopropionate) | MilliporeSigma |
| PhMe | toluene | MilliporeSigma |
| pyr | pyridine | Alfa Aesar |
| SR339 | phenoxyethyl acrylate | Sartomer, Exton, PA |
| Succinic anhydride | succinic anhydride | MilliporeSigma |
| TE1 | TEDA precursor | Prepared as described in Nat. Commun. 2018, 9 (1), DOI: 10.1038/s41467-018-05300-7 |
| TEA | triethyl amine | MilliporeSigma |
| THEMA | tetrahydrofurfuryl methacrylate | MilliporeSigma |
| TPOL | Ethyl-(2,4,6-trimethylbenzoyl)phenyl phosphinate obtained as OMNIRAD TPO-L | IGM Resins, Charlotte, NC |
| TS-720 | fumed silica, obtained as CAB-O-SIL-720 | Cabot Corporation, Boston, MA |
| TS-G | Glycoluril-derived tetrafunctional thiol obtained as TS-G | Shikoku Chemicals Corporation, Marugame Kagawa, Japan |
| TTMP | trimethylolpropane tris 3-mercaptopropionate | MilliporeSigma |
| XT100 | MMA-butadiene-styrene (MBS) core-shell impact modifier obtained as CLEARSTRENGTH XT100 | Arkema, King of Prussia, PA |

Test Methods

Column Chromatography

Unless otherwise noted, column chromatography was performed using a Biotage Isolara One (from Biotage, Uppsala Sweden) and the appropriate Biotage Sfar Flash purification column (from Biotage, Uppsala Sweden) depending on the mass of the material requiring purification.

Formulation Preparation

Formulations were prepared by combining all components into a polypropylene mixing cup (from FlackTek, Inc., Landrum, SC). The cup was closed with a polypropylene lid and the mixture was high shear mixed at ambient temperature and pressure using a SPEEDMIXER (Hauschild Speed-Mixer inc., Dallas, TX) for at least 30 seconds (sec) at 2000 revolutions per minute (rpm).

Film Preparation

On a glass slide was placed a 15-mil (0.38 millimeter (mm)) rubber spacer with an approximately 2 inches×3 inches (5 centimeters (cm)×7.6 cm) rectangular cutout. The formulation was placed in the unfilled rectangle, filling the area. A second glass slide was placed over the uncured formulation. Subsequently, the uncured material was irradiated using two Sylvania 350 blacklight F15 TB 15 Watt (W) bulbs from a height of 1-2 inches (2.54-5.08 cm) for 60 sec. When the glass was removed, a cured film was revealed. Optionally, for materials that will have adhesion to glass, a release liner was placed between the glass slides and the formulation.

Film Degradation Experiments

Films were cut using a razor blade to approximately 1 cm width and placed in a 4 milliliter (mL) vial. Solvent (approximately 2 mL) was added to the vial. The vial was capped and tipped in order to have the majority of the film in contact with the solvent. Degradation was evaluated over time.

Glass Substrate Preparation

Glass substrates were cleaned by soaking in isopropyl alcohol (IPA) for approximately 30 sec, removed from the IPA, placed vertically, and allowed to dry for at least 12 hours (hr) in a hood.

Adhesive Preparation

To a first glass substrate, formulation was placed in a 0.5 inches×1 inches (1.27 cm×2.54 cm) area. A second glass substrate was placed on the formulation. The bound formulation was irradiated with two Sylvania 350 blacklight F15 TB 15W bulbs for 120 sec at 1-2 inches (2.54-5.08 cm) above the substrates.

Degradation Analysis

Bound substrates were placed in glass jars containing solvent. The bound portion was completely submerged in the solvent. The top of the jar was covered with aluminum foil. After the designated amount of time, the substrates were removed. Substrates that were still bound after soaking in either hexylamine, hexanes, or hexylamine/hexanes were rinsed with hexanes (2×4 mL). Substrates that were still bound after soaking in either toluene, or hexylamine/toluene were rinsed with toluene (2×4 mL). Subsequently, the substrates were set to evaporate in the hood at room temperature (RT) for a designated amount of time. If indicated, the substrates were placed in an oven (70° C.) for the indicated amount of time.

Overlap Shear Analysis

Dynamic overlap shear testing was performed at ambient temperature using a Tensile Tester (tensile tester from MTS Sintech, Eden Prairie, MN), with a 10 kilonewton (kN) loadcell. Specimens were loaded into the grips and the crosshead was operated at 0.1 inch per minute (2.54 mm per minute), loading the specimen to failure. Stress at break was recorded in units of megapascals (MPa). The number of samples evaluated are indicated in the results table for each condition. The average and standard deviation for the stress at break is recorded in the results table.

Examples

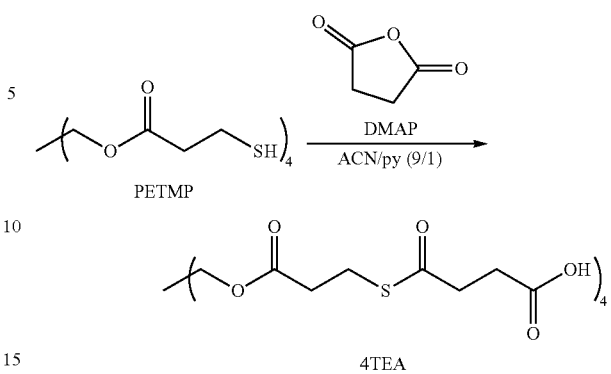

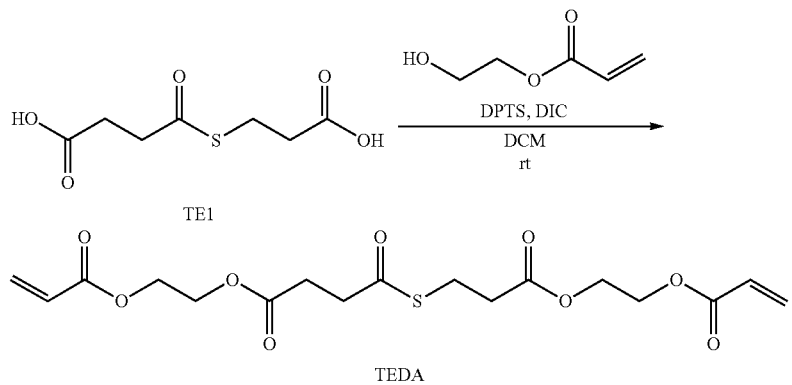

Synthesis of TEDA: To a 500 mL round bottom flask equipped with a stir bar was added TE1 (20. grams (g), 97 millimole (mmol), 1.0 equivalents (equiv.)), BHT (2.14 g, 9.70 mmol, 0.100 equiv.), and DCM (324 mL at 0.3 Molar (M)). To the heterogeneous mixture was added 4-dimethyl-aminopyridinium 4-toluenesulfonate (DPTS, 1.43 g, 8.85 mmol, 0.05 equiv.,) and 2-hydroxyethyl acrylate (20.05 mL, 174.6 mmol, 1.8 equiv.). The mixture was stirred for 5 minutes (min) at RT then diisopropylcarbodiimide (DIC, 33.04 mL, 213.4 mmol, 2.2 equiv.) was added via a syringe. The reaction was stirred for 18 hr at RT. The following day, the solids were filtered and washed with ethyl acetate (3×10 mL) the organic layer was collected and partially concentrated under reduced pressure, when approximately ⅓ of the liquid remained the heterogeneous mixture (white solids in pale yellow viscous liquid) were filtered and washed with ethyl acetate (3×3 mL). This process was repeated once more, then the mixture was concentrated in the hood over night by blowing house air over the liquid. When the resulting material was a viscous yellow oil, it was purified using column chromatography (eluent: Hexane/ethyl acetate 80/20 to 20/80 v/v). The desired product was collected and concentrated by blowing house air overnight yielding a clear viscous oil (37.2 g, 95.3% yield).

Synthesis of 4TEA: To a round bottom flask was added PETMP (2.0 g, 0.0041 mol, 1.0 equiv.), DMAP (50. mg, 0.00041 mol, 0.10 equiv.), succinic anhydride (1.64 g, 0.0164 mol, 4.00 equiv.), ACN (6.0 mL), and pyridine (pyr, 0.60 mL). The solution was heated to 70° C. and stirred for 20 hr. Then, the ACN was removed under reduced pressure. The resulting viscous oil was transferred to a separatory funnel with ethyl acetate (3×10 mL) and washed with 1 Normal aqueous HCl (2×20 mL). The collected aqueous layers were back extracted with ethyl acetate (20 mL). The combined organic layers were dried over $MgSO_4$, filtered, and concentrated under reduced pressure. NMR spectroscopic analysis supports the formation of the desired product, which was used in the synthesis of 4TE4A without additional purification.

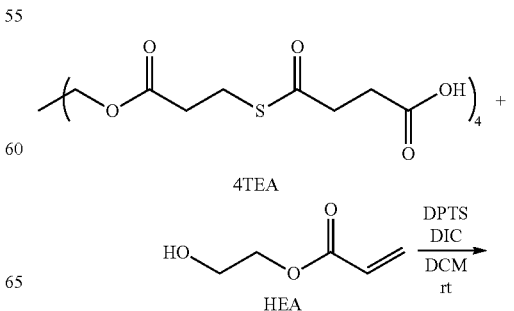

-continued

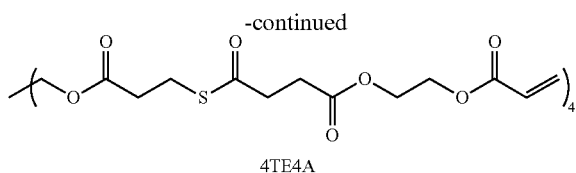

4TE4A

Synthesis of 4TE4A: To a round bottom flask was added 4TEA (3.65 g, 0.00411 mol, 1.00 equiv.), DCM (55 mL), BHT (463 milligrams (mg), 0.00210 mole (mol), 0.511 equiv.), DPTS (240 mg, 0.00082 mmol, 0.20 equiv.) and HEA (1.70 mL, 0.0148 mol, 3.60 equiv.). The solution was stirred for 5 min then DIC (2.28 g, 0.0181 mol, 4.40 equiv.) was added, within 5 min a white precipitate formed. After 20 hr, the solid was removed by filtration and washed with DCM (3×10 mL). The solution was concentrated under reduced pressure until approximately ⅓ of the solvent remained. The heterogeneous mixture was filtered again and washed with DCM (3×10 mL). The DCM was evaporated overnight and flushed with house air. The resulting yellow oil was purified using column chromatography (eluent: gradient from 100% hexanes gradually to 100% ethyl acetate). The desired product was collected as an opaque clear/white viscous oil (3.4 g, 65% yield). BHT (13.6 mg, 0.0008 equiv.) was added to stabilize the crosslinker.

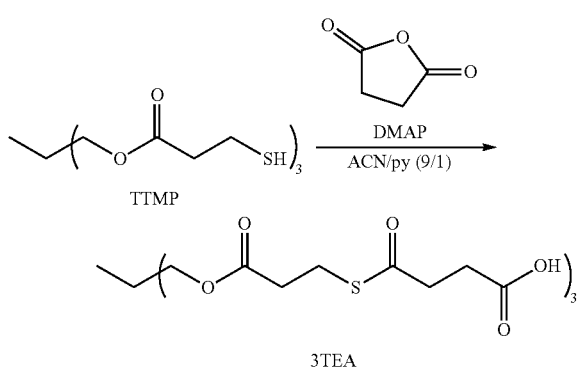

3TEA

Synthesis of 3TEA: To a round bottom flask was added trimethylolpropane tris 3-mercaptopropionate (TTMP, 2.0 g, 0.0050 mol, 1.0 equiv.), DMAP (61.3 mg, 0.502 mmol, 0.100 equiv.), succinic anhydride (1.51 g, 0.0151 mol, 3.00 equiv.), ACN (7.2 mL), and pyr (0.8 mL). The solution was stirred at 70° C. for 24 hr, cooled to RT, and then concentrated partially under reduced pressure. The viscous oil was dissolved in ethyl acetate (3×10 mL), transferred to a separatory funnel, and washed with 1 Normal aqueous HCl (20 mL). The aqueous layer was extracted with ethyl acetate (10 mL). The combined organic layers were dried over MgSO$_4$, filtered, and concentrated under reduced pressure. NMR spectroscopic analysis supported the formation of the desired product which was used in the synthesis of 3TE3A without additional purification.

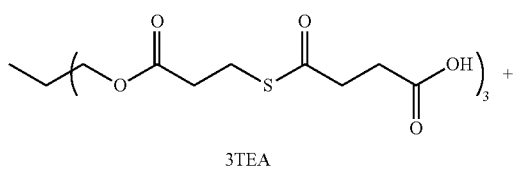

3TEA

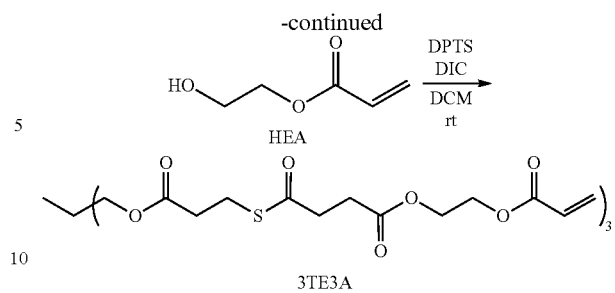

3TE3A

Synthesis of 3TE3A: To a round bottom flask was added 3TEA (3.54 g, 0.00602 mol, 1.00 equiv.), DCM (67.5 mL), HEA (2.10 mL, 0.0183 mol, 3.62 equiv.), BHT (446 mg, 0.00202 mol, 0.400 equiv.), and DPTS (298 mg, 0.00101 mol, 0.200 equiv.) and the mixture was stirred for 5 min at RT. Then DIC (2.81 g, 0.0223 mol, 4.41 equiv.) was added; within 3 min a white precipitate formed. The heterogeneous mixture was stirred over night at RT. After 16 hr, the white solid was filtered and washed with ethyl acetate (3×10 mL). The solution was concentrated under reduced pressure until approximately ⅓ of the solvent remained. The heterogeneous mixture was filtered again and washed with DCM (3×10 mL). The DCM was evaporated overnight and flushed with house air. The crude viscous oil was purified via column chromatography (eluent: gradient from 100% hexanes gradually to 100% ethyl acetate). The desired product was collected as an opaque clear/white viscous oil (3.3 g, 66% yield). BHT (16 mg) was added to stabilize the crosslinker.

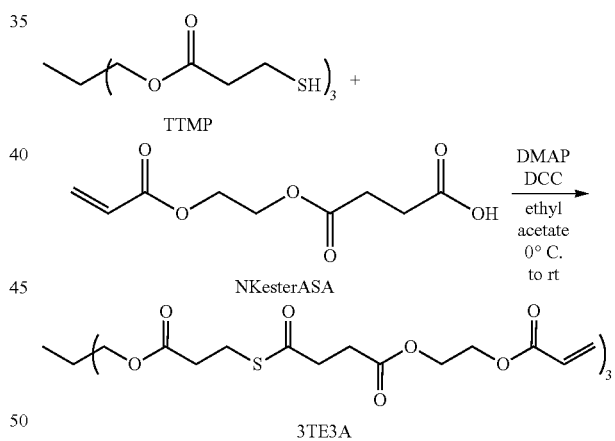

3TE3A

Alternative synthetic route to 3TE3A: To a 200 mL round bottom flask equipped with a stirbar was added DCC (8.5 g, 0.041 mol, 3.3 equiv.) and ethyl acetate (100 mL) and cooled to 0° C. using an ice-water bath. Subsequently, DMAP (0.153 g, 0.00125 mol, 0.0995 equiv.), NK Ester A-SA (8.42 g, 0.0389 mol, 3.10 equiv.), and TMMP (5.0 g, 0.0125 mol, 1.00 equiv.) were added. The reaction mixture was stirred overnight and allowed to warm to RT. After 20 hr, the reaction mixture was filtered, the collected filtrate was concentrated under reduced pressure, yielding a clear colorless oil. The crude product was purified using column chromatography with a gradient of ethyl acetate/hexanes (⅛ to 1/0 v/v). BHT (5 mg) was added to the dissolved desired product which was then concentrated. If any solids were present after concentrating, the resulting material is dissolved in minimal ethyl acetate and filtered until a clear viscous oil is collected. The NMR spectrum of the final product is consistent with the desired product.

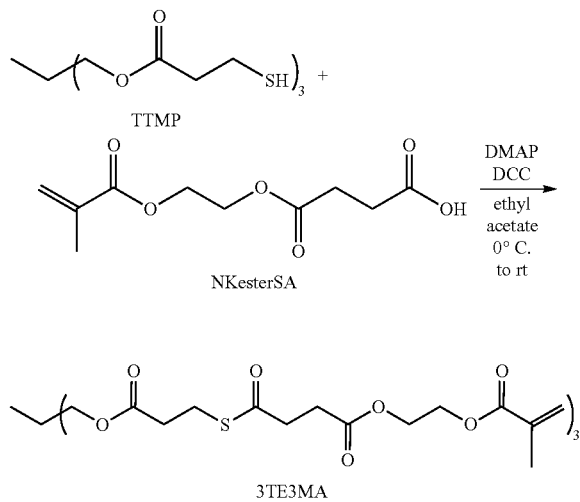

TTMP

NKesterSA

3TE3MA

Synthesis of 3TE3MA: To a round bottom flask was added TTMP (1.0 g, 0.00285 mol, 1.0 equiv.), DMAP (0.23 g, 0.0019 mol, 0.75 equiv.), NK Ester SA (2.02 g, 0.00879 mol, 3.50 equiv.), BHT (100. mg) and ethyl acetate (20 mL). The reaction was stirred to dissolve all components, then cooled to 0° C. using an ice water bath. DCC (1.81 g, 0.00879 mol, 3.50 equiv.) was added, immediately forming a white precipitate. The reaction mixture was stirred overnight and allowed to warm to RT. After 24 hr, the reaction mixture was filtered, the collected filtrate was concentrated under reduced pressure, yielding a clear colorless oil. The crude product was purified using column chromatography with a gradient of ethyl acetate/hexanes (10/90 to 70/30 v/v). BHT (5 mg) was added to the dissolved desired product which was then concentrated. If any solids were present after concentrating, the resulting material was dissolved in minimal ethyl acetate and filtered until a clear viscous oil was collected. The NMR spectrum of the final product is consistent with the desired product.

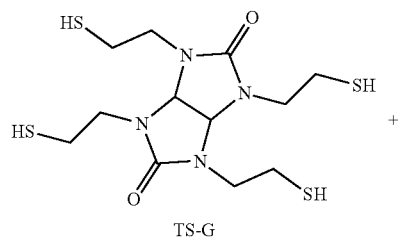

TS-G

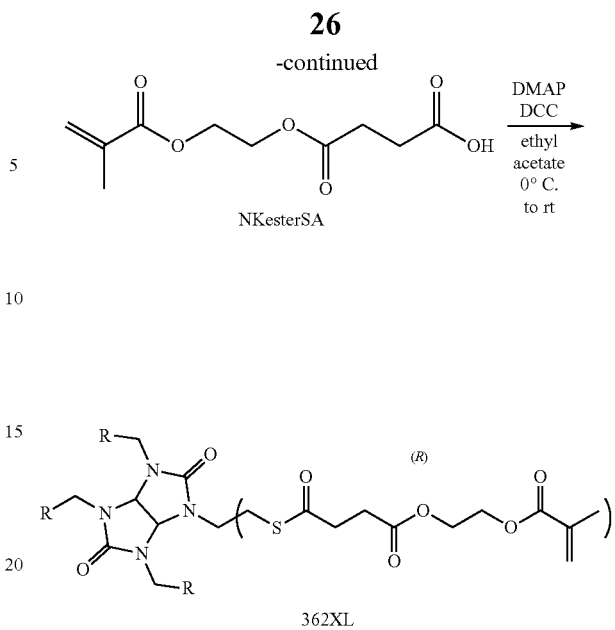

NKesterSA

362XL

Synthesis of 362XL: To a round bottom flask was added TS-G (2.12 g, 0.00554 mols, 1.00 equiv.), DMAP (0.608 g, 0.00498 mol, 0.898 equiv.), NK Ester SA (5.70 g, 0.0248 mol, 4.47 equiv.), BHT (0.200 g, 0.907 mmol, 0.163 equiv.), ethyl acetate (20 mL) and THF (10 mL). The materials were heated with a heat gun for 3× 30s to dissolve completely, stirred for 10 min at RT, then cooled to 0° C. using an ice water bath. DCC (5.18 g, 0.0251 mol, 4.53 equiv.) was added, immediately forming a white precipitate. The reaction mixture was stirred overnight and allowed to warm to RT. After 24 hr, the reaction mixture was filtered, the collected filtrate was concentrated under reduced pressure, yielding a clear colorless oil. The crude product was purified using column chromatography with a gradient of ethyl acetate/hexanes (4/3 to I/O v/v). BHT (5 mg) was added to the dissolved desired product which was then concentrated. If any solids were present after concentrating, the resulting material is dissolved in minimal ethyl acetate and filtered until a clear viscous oil is collected (yield=4.2 g, 61%).

Stock Formulation #1: Stock Formulation #1 was prepared according to the FORMULATION PREPARATION method described above. See Table 2.

TABLE 2

| | | | | | | | | | | | |
|---|---|---|---|---|---|---|---|---|---|---|---|
| Stock formulation #1 | | | | | | | | | | | |
| COMPO-NENT | HEMA | M1089 | CHMA | PAM 200 | EPX IEM | BYMD | XT100 | H18 | DRGNITE | ESS50F | MEHQ |
| wt. % | 19.7 | 19.3 | 19.3 | 3.05 | 9.36 | 5.79 | 5.79 | 1.22 | 15.3 | 1.02 | 0.05 |

Curable Formulations: Curable formulations were prepared according to the FORMULATION PREPARATION method described above. See Tables 3A, 3B, and 3C.

TABLE 3A

Curable Formulations

Components Used (parts by weight)

| EXAMPLE | STOCK FORMULATION #1 | M1088 | 4HBA | TEDA | 4TE4A | 362XL | 3TE3MA | TS-720 | IOTG | TPOL | BEADS 0.5 mil | BEADS 6 mil |
|---|---|---|---|---|---|---|---|---|---|---|---|---|
| EX-1  | 71.5 | —    | —    | —    | —    | —    | 20.6 | —   | 6.1 | 1.7 | —   | 0.6 |
| EX-2  | —    | —    | 21.9 | 42.2 | —    | —    | 21.9 | 4.2 | 8.4 | 1.0 | —   | 0.3 |
| EX-3  | —    | —    | 42.7 | —    | —    | —    | 46.1 | 4.3 | 4.3 | 2.1 | 0.6 | —   |
| EX-4  | —    | —    | 21.9 | 44.6 | —    | 22.4 | —    | 4.4 | 4.8 | 1.4 | —   | 0.4 |
| EX-5  | —    | —    | 43.0 | —    | —    | 43.9 | —    | 4.8 | 5.2 | 2.6 | —   | 0.6 |
| EX-6  | —    | —    | 21.8 | 56.7 | 8.5  | —    | —    | 2.2 | 9.1 | 1.0 | 0.7 | —   |
| EX-7  | —    | 21.9 | —    | 57.0 | 8.8  | —    | —    | 2.2 | 8.7 | 0.9 | 0.4 | —   |
| EX-8  | —    | —    | 22.2 | 43.3 | 21.7 | —    | —    | 2.2 | 8.7 | 1.2 | 0.7 | —   |
| EX-9  | —    | —    | 21.9 | 30.6 | 35.0 | —    | —    | 2.2 | 9.0 | 0.9 | 0.5 | —   |
| EX-10 | —    | —    | 21.9 | —    | 65.8 | —    | —    | 2.2 | 8.8 | 0.9 | 0.4 | —   |

TABLE 3B

Curable Formulations

Components Used (parts by weight)

| EXAMPLE | SR339 | 4HBA | TEDA | 3TE3A | TS-720 | IOTG | TPOL | BEADS 0.5 mil |
|---|---|---|---|---|---|---|---|---|
| CE-A  | —    | —    | 98.9 | —    | —   | —   | 1.1 | —   |
| CE-B  | 49.5 | —    | 49.5 | —    | —   | —   | 1   | —   |
| EX-11 | —    | 49.5 | 49.5 | —    | —   | —   | 1   | —   |
| EX-12 | —    | 24.8 | 74.3 | —    | —   | —   | 1   | —   |
| EX-13 | —    | 22.9 | —    | 64.8 | 2.2 | 8.6 | 1.1 | 0.4 |

TABLE 3C

Curable Formulations

Components Used (parts by weight)

| EXAMPLE | HEMA | M1089 | IBOMA | TEDA | 362XL | 3TE3A | XT100 | TPOL |
|---|---|---|---|---|---|---|---|---|
| EX-14 | 27.3 | 27.6 | 27.3 | —   | 4.9  | —   | 10.9 | 2.0 |
| EX-15 | 26.4 | 26.6 | 26.4 | —   | 8.2  | —   | 10.5 | 2.0 |
| EX-16 | 24.9 | 25.2 | 24.9 | —   | 13.1 | —   | 10.0 | 2.0 |
| CE-C  | 26.4 | 26.6 | 26.4 | 8.2 | —    | —   | 10.5 | 2.0 |
| EX-17 | 26.4 | 26.6 | 26.4 | —   | —    | 8.2 | 10.5 | 2.0 |

Films: Films were prepared according to the FILM PREPARATION method described above. See Table 4.

Additional information related to Table 4: TEXL=thioester crosslinker(s); CTA=Chain transfer agent; ETOH/DABCO=DABCO (5 wt. %) dissolved in ethanol; IOTG/base/acetone was a prepared solution of 1/1/8 v/v/v.; HA=hexylamine; aqueous KOH (aq. KOH) is KOH (1 g) dissolved in deionized water (10 mL); and N=number of samples tested. All film degradation experiments were conducted at room temperature. *indicates the film was placed in 1 mL degradation solvent. **indicates films were not evaluated between the hours after 7 hours until 20 hours when the films had dissolved.

TABLE 4

Film degradation

| EXAMPLE FILM | FORMULATION | TEXL/CTA | SOLVENT TREATMENT | N | AVG TIME FOR N FILMS TO DEGRADE IN MIN (STDV) | OBSERVATIONS OF FILM DEGRADATION AND SOLVENT APPEARANCE |
|---|---|---|---|---|---|---|
| CE-D | CE-A | TEDA/none | HA | 2 | — | no change after 14 days |

TABLE 4-continued

Film degradation

| EXAMPLE FILM | FORMULATION | TEXL/ CTA | SOLVENT TREATMENT | N | AVG TIME FOR N FILMS TO DEGRADE IN MIN (STDV) | OBSERVATIONS OF FILM DEGRADATION AND SOLVENT APPEARANCE |
|---|---|---|---|---|---|---|
| CE-E | CE-B | TEDA/none | HA | 2 | — | swollen film at 14 days |
| CE-F | CE-C | TEDA/none | HA | 2 | — | does not decompose with agitation after 270 min |
| EX-18 | EX-14 | 362XL/none | HA | 2 | 90 (0) | film decomposes into flakes with agitation |
| EX-19 | EX-15 | 362XL/none | HA | 2 | 90 (0) | film decomposes into flakes with agitation |
| EX-20 | EX-16 | 362XL/none | HA | 2 | 90 (0) | film decomposes into flakes with agitation |
| EX-21 | EX-17 | 3TE3A/none | HA | 2 | 90 (0) | film decomposes into flakes with agitation |
| EX-22 | EX-6 | TEDA & 4TE4A/ IOTG | HA | 3 | 17 (4) | dissolved-transparent |
| EX-23 | EX-8 | TEDA & 4TE4A/ IOTG | HA | 3 | 17 (4) | dissolved-transparent |
| EX-24 | EX-9 | TEDA & 4TE4A/ IOTG | HA | 3 | 18 (3) | dissolved-transparent |
| EX-25 | EX-10 | 4TE4A/ IOTG | HA | 1 | 15 | dissolved-transparent |
|  |  |  | aq. KOH* | 1 | 20 hour ** | film decomposes into flakes which are not soluble in aq KOH |
| EX-26 | EX-7 | TEDA & 4TE4A/ IOTG | HA | 3 | 64 (1) | dissolved-pearlescent |
| EX-27 | EX-2 | TEDA & 3TE3MA/ IOTG | HA | 3 | 26 (4) | dissolved-transparent |
| EX-28 | EX-3 | 3TE3MA/ IOTG | HA | 3 | 15 (1) | decomposed into flakes |
| EX-29 | EX-4 | TEDA & 362XL/ IOTG | HA | 1 | 140 | film decomposes into flakes without agitation |
|  |  |  | ethanolamine | 2 | 360 (0) | dissolved-transparent |
|  |  |  | PhMe | 1 | — | swollen film at 14 days |
|  |  |  | hexane | 1 | — | no change after 14 days |
|  |  |  | MEK | 1 | — | no change after 7 days |
|  |  |  | DCM | 1 | — | swollen film at 7 days |
|  |  |  | EtOH | 1 | — | no change after 7 days |
| EX-30 | EX-5 | 362XL/ IOTG | HA | 2 | 17 (0) | decomposed into flakes |
| EX-31 | EX-13 | 3TE3A/ IOTG | HA | 2 | 18 (1) | dissolved |
|  |  |  | hexanes | 2 | — | no change at 14 days |
|  |  |  | EtOH | 2 | — | no change at 14 days |
|  |  |  | EtOH/DABCO | 2 | — | no change at 14 days |
|  |  |  | TEA | 2 | — | no change at 14 days |
|  |  |  | IOTG | 2 | — | no change at 14 days |
|  |  |  | IOTG/TEA/acetone | 2 | 20 hour (0)** | dissolved with a few polymer strands remaining-transparent |
|  |  |  | IOTG/DBU/acetone | 2 | 7 days (0) | film decomposes into flakes with agitation |

Adhesives: Adhesives were prepared according to the ADHESIVE PREPARATION method described above. See Table 5.

Additional information related to Table 5: TEXL=thioester crosslinker(s) and N=number of samples tested. Bound substrates were soaked in solvent treatment at room temperature. Treatment solvents with more than one component were mixed prior to substrate soaking and are listed in volume to volume (v/v) ratios. The samples evaluated as prepared are indicated by having "none" written in the solvent treatment column and were stored at room temperature until evaluation. PhMe=toluene. HA=hexylamine. * indicates samples broke prior to analysis.

TABLE 5

Adhesive degradation

| EXAMPLE ADHESIVE | FORMU-LATION | TEXL | SOLVENT TREATMENT: TIME IN SOLVENT, hr | CONDITIONS AFTER SOLVENT TREATMENT | AVG (STDV) BREAK STRESS, MPa | N | AVERAGE % CHANGE FROM NON-TREATED SAMPLE |
|---|---|---|---|---|---|---|---|
| EX-32 | EX-14 | 362XL | None | — | 2.5 (0.4) | 6 | — |
|  |  |  | HA/hexanes 5/6 v/v: 18 hr | 3 hr at RT | 0.7 (0.3) | 6 | −71 |
|  |  |  | Hexanes: 18 hr | 3 hr at RT | 3 (0.7) | 6 | 21 |
| EX-33 | EX-4 | TEDA, 362XL | None | — | 2.2 (0.6) | 5 | — |
|  |  |  | HA/PhMe 5/6 v/v: 6 hr | 20 hr at 70° C. | 0.5 (0.1) | 2 | −76 |
|  |  |  | HA/PhMe 5/6 v/v: 6 hr | * | 0 (0) | 2 | −100 |
|  |  |  | HA/hexanes 5/6 v/v: 16 hr | 20 hr at 70° C. | 1.3 (1.1) | 2 | −41 |
|  |  |  | HA/hexanes 5/6 v/v: 16 hr | 20 hr at 70° C. | 0 (0) | 4 | −100 |
| EX-34 | EX-1 | 3TE3MA | None | — | 2.5 (0.6) | 10 | — |
|  |  |  | HA/PhMe 5/6 v/v: 6 hr | 20 hr at 70° C. | 2.2 (0.7) | 6 | −14 |
|  |  |  | HA/PhMe 5/6 v/v: 16 hr | * | 0 (0) | 3 | −100 |
|  |  |  | PhMe: 16 hr | 20 hr at 70° C. | 1.9 (0.7) | 6 | −38 |
|  |  |  | Hexanes: 16 hr | 20 hr at 70° C. | 4.1 (1) | 2 | 63 |

Foreseeable modifications and alterations of this invention will be apparent to those skilled in the art without departing from the scope and spirit of this invention. This invention should not be restricted to the embodiments that are set forth in this application for illustrative purposes. All cited references, patents, and patent applications in the above application for letters patent are herein incorporated by reference in their entirety in a consistent manner. To the extent that there is any conflict or discrepancy between this specification as written and the disclosure in any document mentioned or incorporated by reference herein, this specification as written will prevail.

What is claimed is:

1. A curable composition comprising:

a mono (meth)acrylate ester monomer comprising at least 4 and no more than 20 carbon atoms;

a thioester-containing (meth)acrylate crosslinking agent; and an initiator system, wherein the thioester-containing (meth)acrylic crosslinking agent is (a) of formula (I)

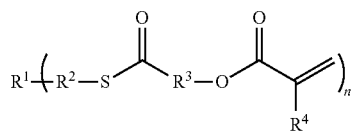

wherein:

$R^1$ is (i) $X^2L^2X^2$, wherein each $X^2$ is independently S or O; and $L^2$ is a divalent alkylenyl group, which may be linear or branched or (ii) $C(X^3)_mL^3C(X^4)_p$, wherein $X^3$ and $X^4$ are independently a linear or branched alkyl group, $L^3$ is divalent group comprising a S or O atom, m and p are independently selected from 0, 1 or 2, and n in formula (I) is an integer from 2 to 6, wherein p+m+n=6;

$R^2$ is a divalent alkylenyl group comprising at least 1 carbon atom and optionally comprising at least 1 ester linkage;

$R^3$ is a divalent alkylenyl group comprising at least 1 carbon atom and optionally comprising at least 1 ester linkage; and $R^4$ is a H or a methyl group;

(b) is at least one of the following:

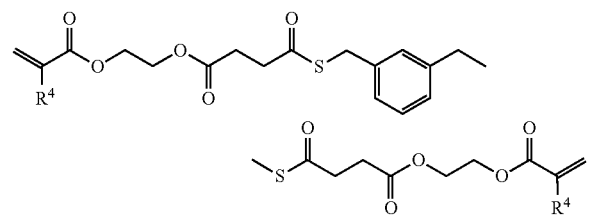

33
-continued
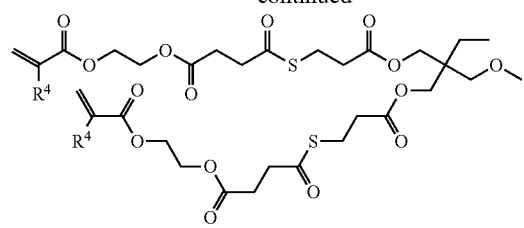
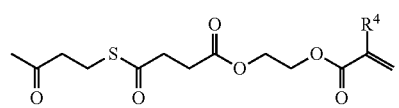
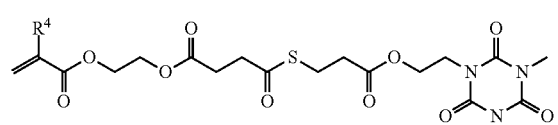
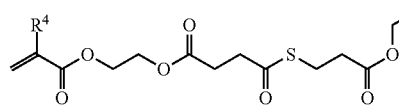
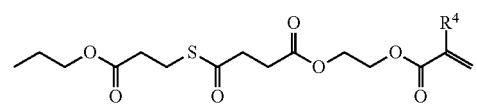
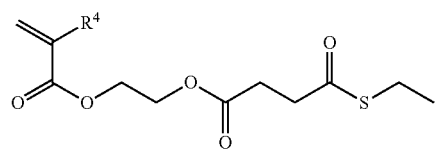
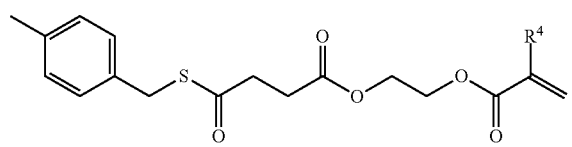
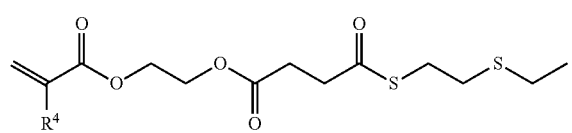
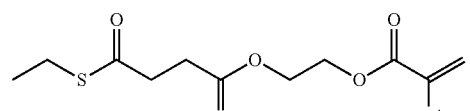
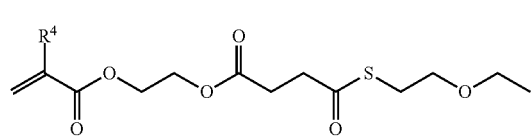
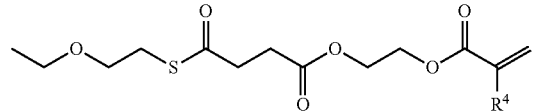
34
-continued
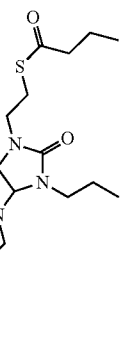
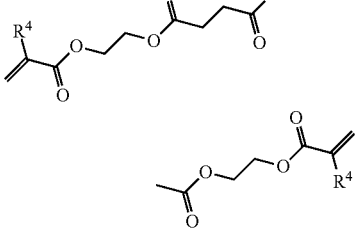
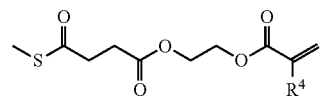
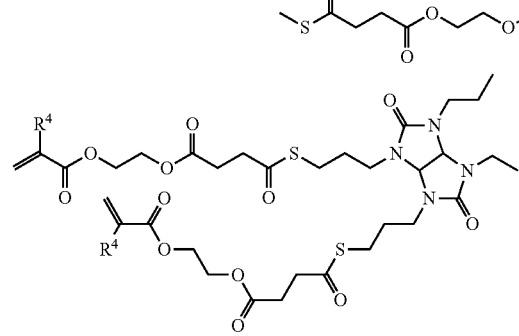
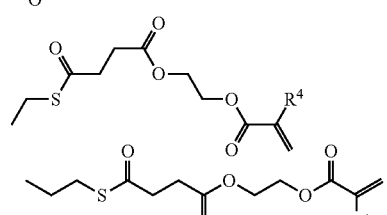
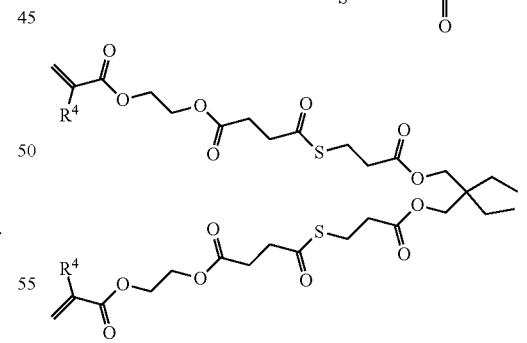
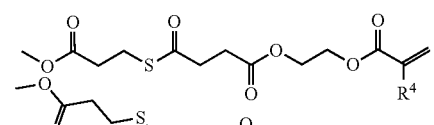
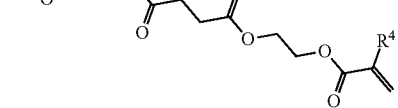

-continued

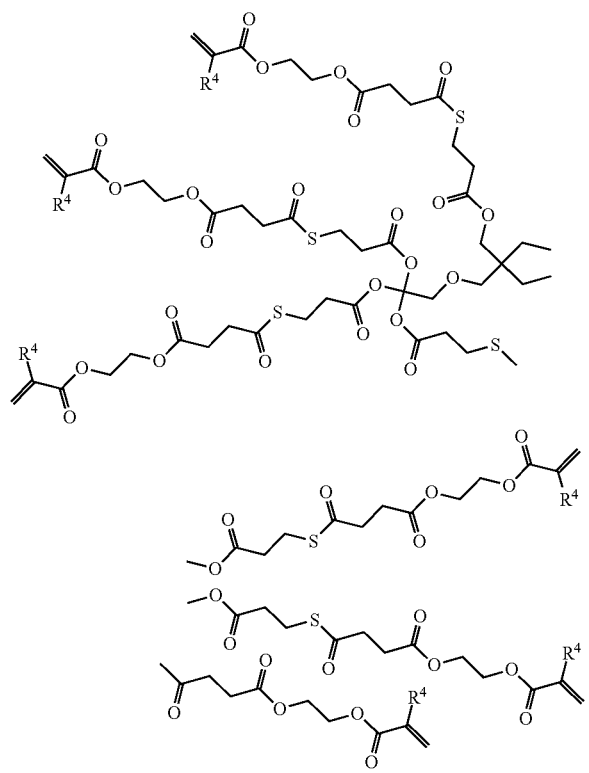

where R⁴ is H or methyl group.

2. The curable composition of claim 1, wherein the curable composition comprises at least 3 and at most 50% by weight of the thioester-containing (meth)acrylic crosslinking agent based on the total weight of monomers.

3. The curable composition of claim 1, wherein the curable composition further comprises an acid-functional monomer.

4. The curable composition of claim 1, wherein the curable composition further comprises a polar ethylenically unsaturated monomer, optionally wherein the curable composition comprises at least 0.1% and no more than 99% by weight of the polar ethylenically unsaturated monomer based on the total weight of monomers.

5. The curable composition of claim 1, wherein the curable composition further comprises a second multifunctional ethylenically unsaturated monomer.

6. The curable composition of claim 1, wherein the initiator is a photoinitiator or a redox initiator system.

7. A cured (meth)acrylate composition derived from the curable composition of claim 1.

8. The cured (meth)acrylate composition of claim 7, wherein the cured (meth)acrylate composition is an adhesive, a coating, or a sealant.

9. A method of degrading a cured (meth)acrylate composition, the method comprising:
    contacting the cured (meth)acrylate composition according to claim 7 to a nucleophilic solvent.

* * * * *